United States Patent [19]

Badcock

[11] Patent Number: 4,776,414

[45] Date of Patent: Oct. 11, 1988

[54] DRUM WEIGHER

[76] Inventor: Francis D. M. Badcock, Little Court House, Hambrook, Chichester, West Sussex, PO18 8UE, England

[21] Appl. No.: 107,091

[22] Filed: Oct. 13, 1987

[30] Foreign Application Priority Data

Oct. 10, 1986 [GB] United Kingdom ............... 8624340

[51] Int. Cl.$^4$ ...................... G01G 3/14; G01G 19/00; G01L 1/22
[52] U.S. Cl. .................................... 177/211; 177/145; 73/862.65
[58] Field of Search .............................. 177/145, 211; 73/862.65

[56] References Cited

U.S. PATENT DOCUMENTS

| | | | |
|---|---|---|---|
| 4,047,584 | 9/1977 | Daly | 177/211 |
| 4,146,864 | 3/1979 | Bethe | 73/862.65 |
| 4,319,651 | 3/1982 | Robichaud | 177/229 |
| 4,382,478 | 5/1983 | Hearn | 177/225 |

FOREIGN PATENT DOCUMENTS

WO85/01576 4/1985
2127980 4/1984 United Kingdom .

*Primary Examiner*—George H. Miller, Jr.
*Attorney, Agent, or Firm*—Hall, Myers & Rose

[57] ABSTRACT

A weigher is provided for weighing drums, barrels and the like in which a point around the periphery of the bottom edge of the drum is rested on a low-level, weighing capsule, the diametrically opposite point remaining on the floor. The capsule is a disc with a central blind bore open downwardly, the blind upper end being spanned by a diaphragm which sustains the load to be weighed and has a pattern of electrical strain gauges on its underside. A sloping back-stop ensures proper location of the drum to be weighed on the weighing capsule.

11 Claims, 4 Drawing Sheets ically opposite point of the bot-

DRUM WEIGHER

This invention relates to weighers for drums and barrels and their contents.

Hitherto, the usual method of weighing a drum or barrel has been to lift the whole item on to a weighing platform, or suspend it on a load link, which can be inconvenient. It is an object of the invention to provide a drum weigher that does not require the whole drum and its contents to be lifted.

It has been proposed that a drum, or the like, be weighed by tilting the drum and resting one edge on the free end of a cantilever load bar on which conventional strain gauges are mounted. However, there are various disadvantages to this arrangement and it has not gained commercial acceptance.

According to the present invention, there is provided a weigher for drums, barrels and the like comprising a low level weighing capsule upon which a point around the bottom edge of a drum or the like to be weighed is supported, the diametrically opposite point of the bottom edge of the drum resting on the floor, the capsule including a horizontally disposed diaphragm upon the centre of which the point load of the drum or the like is sustained and which bears a pattern of electrical strain gauges connected into electrical circuitry to provide an electrical signal that varies in accordance with the load on the diaphragm.

One arrangement in accordance with the invention will now be described by way of example and with reference to the accompanying drawings, in which.

A drum or barrel, with a circular base, resting on end with one side raised on a point contact, automatically balances itself on the point of contact at the lifted side and on the point diametrically opposite. If the load is measured at the point of lifting it represents half the weight of the drum and its contents, providing the angle of tilt is only slight so that the centre of gravity can still be considered as lying substantially above a point halfway between the two support points.

Figure 1:
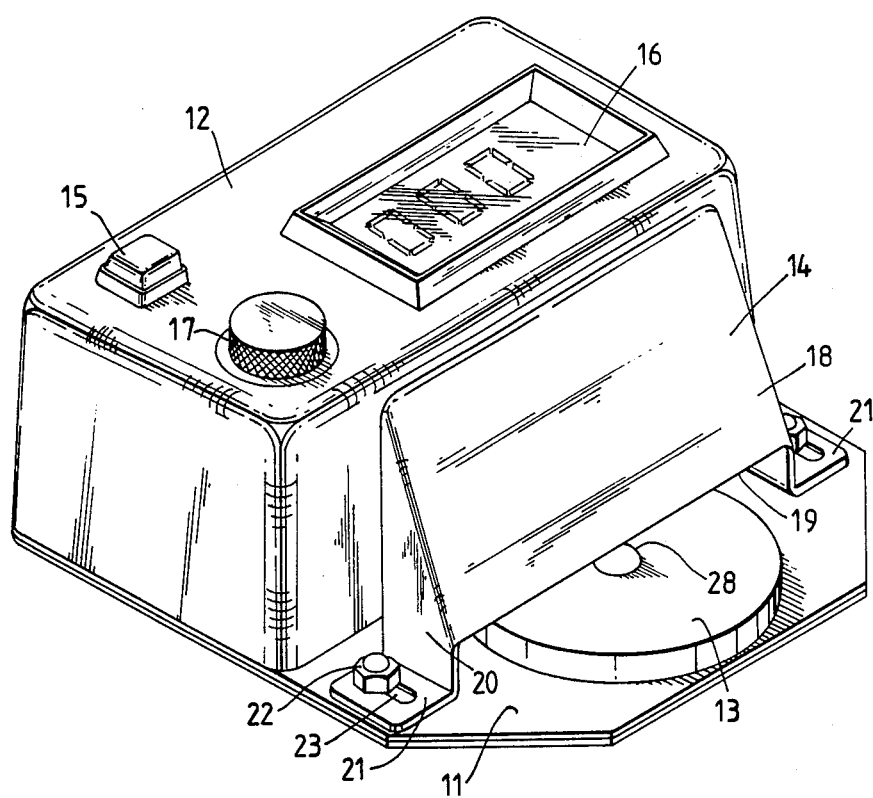
FIG. 1 is a pictorial view of the drum weigher.

Referring now to FIG. 1, this shows a drum weigher having a stainless steel base plate 11, a die-cast cover or enclosure 12 covering just over half of the base plate, a low circular weighing capsule 13 disposed centrally on the uncovered area of the base plate and a sloping drum back-stop 14 covering something less than half of the weighing capsule at the side thereof next the cover 12.

The cover 12 houses the electronic circuitry of the weigher and provides at its top face a control and read-out console having an on/off switch 15, a read-out panel 16 giving a display, for example a liquid crystal display, in figures of the load weighed, and an adjustment knob 11 operating a potentiometer for adjusting the tare weight to which the instrument is set.

The back-stop 14 is made by bending stainless steel sheet and has a front face 18 with its lower edge 19 lying across the weighing capsule 13, a short distance above it, leaving the centre of the capsule uncovered. From its lower edge 19, the front face of the back-stop extends upwardly with a backward slope toward the cover 12. At its ends the back-stop 14 has vertical support walls 20 extending down to brackets 21 that are secured to the base plate 11.

The securing is by means of screws 22 in slotted holes 23 allowing adjustment of the back-stop toward and away from the cover 11. In the example shown, the amount of available adjustment is 8 mm.

Figure 2:
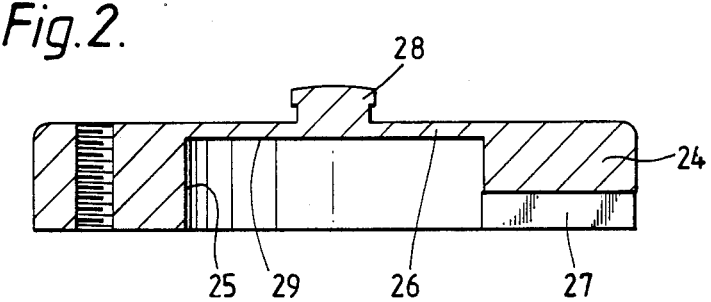
FIGS. 2 and 3 are, respectively, a sectional elevation and an underneath plan of a weighing capsule of the drum weigher.
Figure 3:
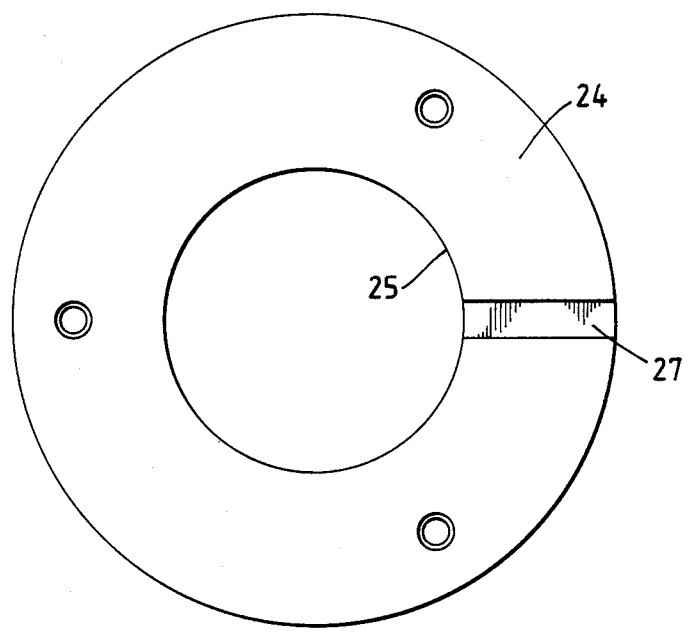

Referring now to FIGS. 2 and 3, these show the weighing capsule 13, made of Carr's P576 or equivalent. In manufacture, it is hardened and tempered and then zinc plated. The capsule consists of a circular disc 24 which, in the example shown is 50 mm in diameter and 8.5 mm thick, with a central blind bore 25, 25 mm in diameter and 7.3 mm deep, to leave a diaphragm 26, 1.2 mm thick, spanning the blind end of the bore. This capsule is screwed to the base-plate 11 with the open end of the bore 24 downward. At the side nearer the cover 12, the capsule has a channel 27 through the lower part of the circular portion of it surrounding the bore 25, to vent the interior and give access for electrical leads.

Figure 4:
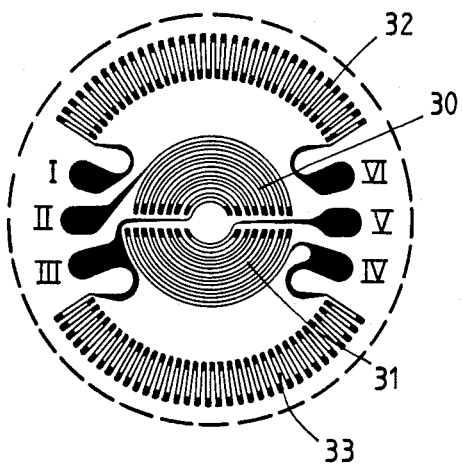
FIG. 4 illustrates the layout of strain gauges in the weighing capsule, and, FIGS. 5 and 6 are the component and the track sides respectively of a printed circuit board incorporated in the weigher.

At the centre of the upper side of the diaphragm 26 there is an integral head 28 of domed and undercut configuration, which serves as the rest point for the edge of a drum to be weighed. The top of the dome is only 11.5 mm above base level. The underside 29 of the diaphragm 26 is fine machined and bears a pattern of electrical strain gauges as depicted in FIG. 4. It will be seen that, in the example illustrated, there are four strain gauge sections 30, 31, 32, 33, the sections 30 and 31 being laid down as to and fro semicircular patterns about the centre while the sections 32 and 33 are laid down as arcuate bands near the periphery of the diaphragm in which the conductors zig zag to and fro radially. Sections 30, 31 and 33 are connected in series with tapping points at the connections. No invention is claimed in this strain gauge lay-out per se.

Figure 5:
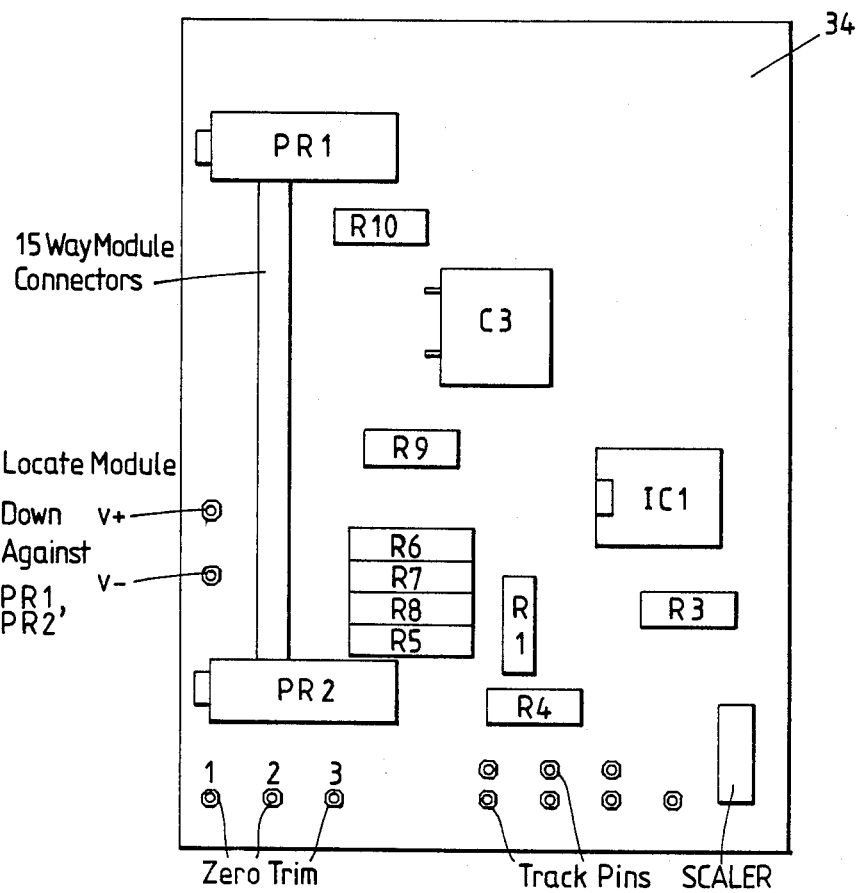
Figure 6:
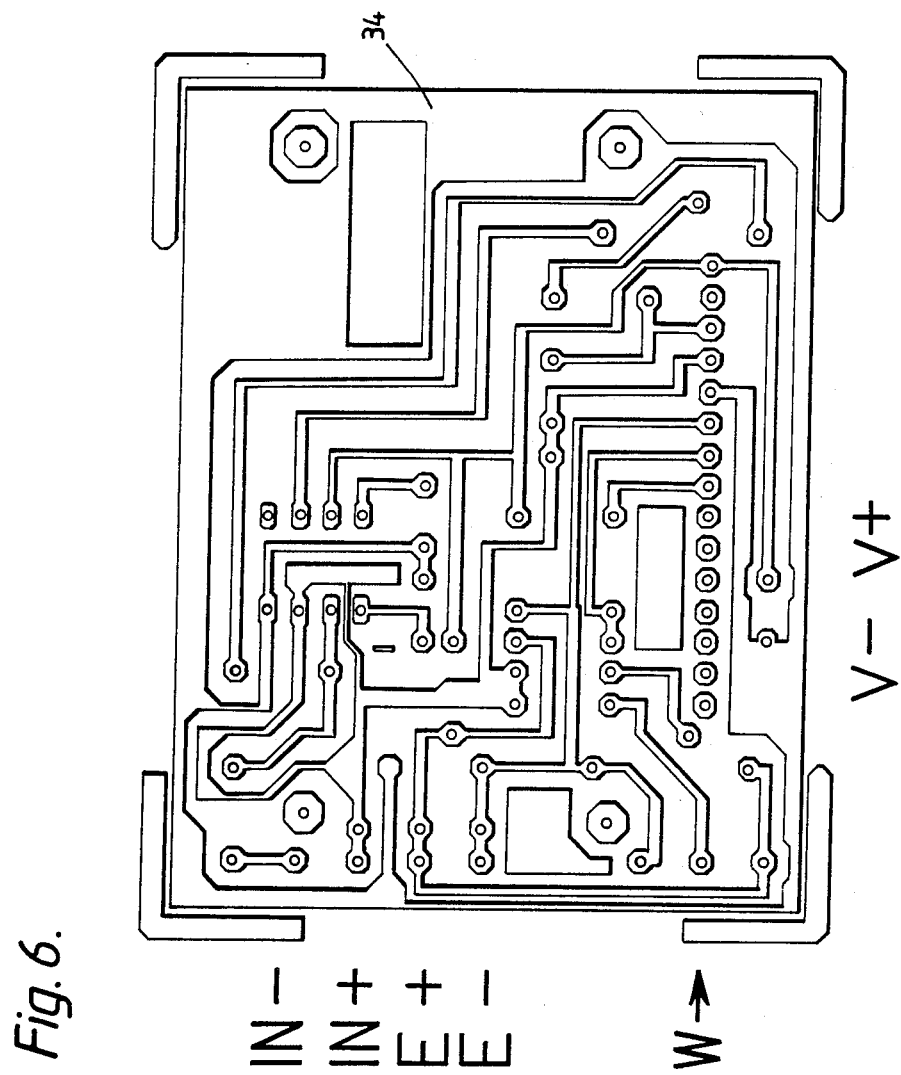

The strain gauges on the diaphragm of the weighing capsule are connected by circuit leads (not shown) passing through the channel 27 to a printed circuit board 34 housed inside the cover 12 and the details of which are shown in FIGS. 5 and 6.

The drum weigher described is of compact and rugged construction and is simple to use. The sloping back-stop 14 helps the edge of a drum to slide down into the correct position for weighing on the domed head 28. Loads up to 250 kg can be weighed with a tare weight adjustment of ±50 kg, the accuracy of weighing the drum contents being ±2%. The circuitry is battery powered making the drum weigher entirely portable.

What I claim is:

1. A weigher for drums, barrels and the like comprising a low level weighing capsule upon which a point around the bottom edge of a drum or the like to be weighed is supported, the diametrically opposite point of the bottom edge of the drum resting on the floor, the capsule including a horizontally disposed diaphragm upon the center of which the point load of the drum or the like is sustained and which bears a pattern of electrical strain gauges connected into electrical circuitry to provide an electrical signal that varies in accordance with the load on the diaphragm.

2. A weigher according to claim 1, wherein the weighing capsule is formed by a circular disc that has a central blind bore with the diaphragm spanning the blind end of the bore, the capsule disc being mounted horizontally with the open end of the bore downward and the diaphragm uppermost, and the pattern of strain gauges is located on the underside of the diaphragm.

3. A weigher according to claim. 2, wherein the diaphragm has an integral head formed centrally on its upperside which head is domed and undercut and provides the support for the load to be weighed.

4. A weigher according to claim 2 or claim 3, wherein the annular part of the capsule disc surrounding the bore has a radial channel through it for venting and to provide access for electrical leads.

5. A weigher according to claim 1 or claim 2 or claim 3 further comprising a back-stop extending across the capsule above it at a location a short distance beyond the center of the capsule, to locate the edge of a drum or the like to be weighed.

6. A weigher according to claim 4, further comprising a back-stop extending across the capsule above it at a location a short distance beyond the center of the capsule, to locate the edge of a drum or the like to be weighed.

7. A weigher according to claim 5, wherein the back-stop comprises a wall extending upwardly away from the capsule and also sloping in the upward direction away from a vertical plane containing the center of the capsule.

8. A weigher according to claim 5 wherein the back-stop is adjustable toward and away from the center of the capsule.

9. A weigher according to claim 7, wherein the back-stop is adjustable toward and away from the center of the capsule.

10. A weigher according to claim 1 or claim 2 or claim 3 further comprising control means for setting the tare weight of a drum or the like to be weighed so that the weight of the drum contents can be indicated.

11. A weigher according to claim 1 or claim or claim 3 wherein the electrical circuitry is battery operated.

* * * * *